(12) United States Patent
Bouchard et al.

(10) Patent No.: US 11,385,101 B2
(45) Date of Patent: Jul. 12, 2022

(54) HIGH RESOLUTION AND HIGH THROUGHPUT SPECTROMETER

(71) Applicant: NATIONAL RESEARCH COUNCIL OF CANADA, Ottawa (CA)

(72) Inventors: Paul Bouchard, Boucherville (CA); Mohamad Sabsabi, Boucherville (CA); Christian Padioleau, Boucherville (CA)

(73) Assignee: NATIONAL RESEARCH COUNCIL OF CANADA

( * ) Notice: Subject to any disclaimer, the term of this patent is extended or adjusted under 35 U.S.C. 154(b) by 0 days.

(21) Appl. No.: 17/045,378

(22) PCT Filed: Apr. 24, 2019

(86) PCT No.: PCT/CA2019/050520
§ 371 (c)(1),
(2) Date: Oct. 5, 2020

(87) PCT Pub. No.: WO2019/204928
PCT Pub. Date: Oct. 31, 2019

(65) Prior Publication Data
US 2021/0148756 A1    May 20, 2021

Related U.S. Application Data

(60) Provisional application No. 62/662,468, filed on Apr. 25, 2018.

(51) Int. Cl.
*G01J 3/28* (2006.01)
*G01J 3/18* (2006.01)
*G01J 3/02* (2006.01)

(52) U.S. Cl.
CPC ........... *G01J 3/1804* (2013.01); *G01J 3/0208* (2013.01); *G01J 3/0256* (2013.01); *G01J 3/1838* (2013.01); *G01J 2003/1861* (2013.01)

(58) Field of Classification Search
CPC ........ G01J 3/18; G01J 3/12; G01J 3/28; G01J 3/26; G01J 3/02; G01J 3/44; G01J 3/00; G01J 3/10
See application file for complete search history.

(56) References Cited

U.S. PATENT DOCUMENTS 3,888,590 A   6/1975 White
4,371,263 A   2/1983 Witte
(Continued)

FOREIGN PATENT DOCUMENTS

| CN | 85107948 A | 3/1990 |
| DE | 102015108818 B4 | 12/2016 |
| WO | 2017121583 A1 | 7/2017 |

OTHER PUBLICATIONS

International Search Report of PCTCA2019/050520 dated Jun. 21, 2019.
(Continued)

*Primary Examiner* — Abdullahi Nur

(57) ABSTRACT

Spectrometer designs are provided. The spectrometer includes two planar diffraction gratings disposed in a cascade, without intervening optics therebetween. Advantageously, the described configurations may promote both a high throughput and a high resolution, enabling the design of a portable device having sufficient resolution for on-site use or in the laboratory. In some implementations, two different secondary diffraction channels may be provided.

21 Claims, 3 Drawing Sheets

(56) References Cited

U.S. PATENT DOCUMENTS

| | | | |
|---|---|---|---|
| 4,571,074 | A | 2/1986 | Thevenon |
| 4,697,924 | A | 10/1987 | Akiyama |
| 5,274,435 | A | 12/1993 | Hettrick |
| 5,442,439 | A | 8/1995 | Battey et al. |
| 6,166,805 | A | 12/2000 | Mori et al. |
| 6,269,203 | B1 | 7/2001 | Davies et al. |
| 6,765,724 | B1 | 7/2004 | Kramer |
| 7,149,387 | B2 | 12/2006 | Balakrishnan et al. |
| 7,265,827 | B2 | 9/2007 | Slutter et al. |
| 8,873,050 | B1 | 10/2014 | Flock |
| 9,246,310 | B2 * | 1/2016 | Goyal .................... B82Y 20/00 |
| 2004/0218261 | A1 | 11/2004 | Tuunanen |
| 2005/0018187 | A1 | 1/2005 | Slutter et al. |
| 2007/0223007 | A1 * | 9/2007 | Klaver ............... G03F 7/70775 356/499 |
| 2009/0262347 | A1 | 10/2009 | Yamamoto et al. |
| 2011/0279887 | A1 | 11/2011 | Li et al. |
| 2013/0128343 | A1 | 5/2013 | Li et al. |
| 2016/0187200 | A1 | 6/2016 | Luce |

OTHER PUBLICATIONS

Written Opinion of PCTCA2019/050520 dated Jun. 21, 2019.

Barnett, Patrick D., Lamsal, Nirmal, et Angel, S. Michael. Standoff laser-induced breakdown spectroscopy (LIBS) using a miniature wide field of view spatial heterodyne spectrometer with sub-microsteradian collection optics. Applied spectroscopy, 2017, vol. 71, No. 4, p. 583-590.

Burger, Ines, Scharpf, Marcus, Hennenlotter, Jorg, et al. Tissue differentiation by means of high resolution optical emission spectroscopy during electrosurgical intervention. Journal of Physics D: Applied Physics, 2016, vol. 50, No. 3, p. 035401.

Holden, William M., Hoidn, Oliver R., Ditter, Alexander S., et al. A compact dispersive refocusing Rowland circle X-ray emission spectrometer for laboratory, synchrotron, and XFEL applications. Review of Scientific Instruments, 2017, vol. 88, No. 7, p. 073904.

Murty, M. V. R. K. "Coma-free double monochromator without intermediate slit." Applied Optics 11, No. 10 (1972) 2286-2288.

Pang, Yajun, Yinxin Zhang, Huaidong Yang, Zeyang Liu, Zhanhua Huang, and Guofan Jin. "Compact high-resolution spectrometer using two plane gratings with triple dispersion." Optics Express 26, No. 5 (2018): 6382-6391.

* cited by examiner

HIGH RESOLUTION AND HIGH THROUGHPUT SPECTROMETER

CROSS-REFERENCE TO RELATED APPLICATIONS

This application is the 35 U.S.C. § 371 national stage application of International Application No. PCT/CA2019/050520, filed on Apr. 24, 2019 which claims priority of U.S. Provisional Patent Application No. 62/662,468, filed on Apr. 25, 2018, both of which are incorporated herein by reference in their entirety.

TECHNICAL FIELD

The technical field generally relates to spectrometer design.

BACKGROUND

In many industrial sectors, there is a need for analytical tools that allow the accurate and precise quantitative determination of elements in samples, without having to resort on external laboratory analysis. Optical reflectance or emission spectroscopy, such as the Laser-Induced Breakdown Spectroscopy (LIBS) technology, is an example of a technology that lends itself to the system designs that are portable or transportable, which can bring elemental analysis in situ, on line, in-line or other similar contexts.

For these approaches, performance parameters such as sensitivity, repeatability and low limits of detection are desired. All the devices and components of a given analytical system need to provide the desired performance. For instance, in the case of the LIBS technique, the spectrometer and detector assembly configuration is a major component which poses a design challenge as this configuration needs to maximize the spectral resolution and signal throughput, while maintaining physical compactness and mechanical and thermal robustness.

Several spectrometer designs are known in the art, such as the standard Czerny-Turner, the echelle and the Paschen-Runge configurations. However, these common designs fail to adequately meet the all the requirements of sensitive and accurate portable systems. Indeed, on the one hand, a high sensitivity and resolution can typically be achieved using a spectrometer characterized by a long focal length and coupled to a sensitive detector, such as a Czerny-Turner or echelle design coupled with an intensified CCD camera (ICCD), or a Paschen-Runge polychromator design. These options are however generally heavy, bulky, not robust and quite expensive, and therefore are not suitable for compact, transportable and hand-held devices. On the other hand, portability is typically achieved using a compact design of spectrometer (typically a Czerny-Turner) equipped with a CCD line camera. However, this combination typically provides a limited sensitivity and spectral resolution and is therefore unsuitable for several industrial applications of interest, such as the measurement of elemental composition of samples at low concentrations.

In view of the above, there remains a need for a spectrometer design which can be part of an analytical system which has a high resolution and sensitivity while also be compact enough to be portable.

SUMMARY

In accordance with one aspect, there is provided a spectrometer for spectrally dispersing a light beam. The spectrometer includes a planar primary diffraction grating positioned in a path of the light beam and diffracting the light beam into positive and negative primary diffracted beams. First and second secondary diffraction channels respectively receiving the positive and negative primary diffracted beams are also provided. Each secondary diffraction channel includes a planar secondary diffraction grating positioned in a path of the corresponding primary diffracted beam. The secondary diffraction grating diffracts the corresponding primary diffracted beam into a twice diffracted beam. The secondary diffraction grating of each secondary diffraction channels is disposed in a cascade with the primary diffraction grating without intervening optics therebetween.

In some implementations, the primary diffraction grating and each and secondary diffraction grating has a plurality of holographic or structural grooves.

In some implementations, the spectrometer further includes collimating input optics upstream the primary diffraction grating. The collimating input optics may include one or more transmissive optical components collimating the light beam.

For example, the collimating input optics may include a collimating lens disposed in front of the primary diffraction grating.

In some implementations, each secondary diffraction channel of the spectrometer may include imaging output optics downstream the corresponding secondary diffraction grating. The imaging output optics of each secondary diffraction channel may include transmissive optical components imaging the corresponding twice diffracted beam. For example, the imaging output optics of each secondary diffraction channel may include an imaging lens disposed in a path of the corresponding twice diffracted beam.

In some implementations, the imaging output optics of each secondary diffraction channel comprise a wavelength tuning refractive plate.

In accordance with another aspect, there is also provided a spectrometer for spectrally dispersing a light beam. The spectrometer includes a planar primary diffraction grating positioned in a path of the light beam, the primary diffraction grating diffracting the light beam into a primary diffracted beam. The spectrometer further includes a planar secondary diffraction grating positioned in a path of the primary diffracted beam. The secondary diffraction grating diffracts the primary diffracted light beam into a twice diffracted beam. The primary and secondary diffraction gratings are disposed in a cascade without intervening optics therebetween.

In some implementations, the primary and secondary diffraction gratings each include a plurality of holographic grooves. In other variants, the primary and secondary diffraction gratings each has a plurality of structural grooves formed on a surface of the corresponding one of said primary and secondary diffraction grating.

In some implementations, the spectrometer further includes collimating input optics upstream the primary diffraction grating. The collimating input optics may include one or more transmissive optical components collimating the light beam. For example, the collimating input optics may include an input slit and a collimating lens disposed in front of the primary diffraction grating.

In some implementations, the spectrometer may further include imaging output optics downstream of the secondary diffraction grating. The imaging output optics may include transmissive optical components imaging the twice diffracted beam. For example, the output optics may include an imaging lens disposed in a path of the twice diffracted beam.

The imaging output optics may further include a pair of beam folding mirrors disposed downstream the imaging lens.

In some implementations, the spectrometer may be used or provided in combination with a photodiode disposed at an imaging plane of the imaging output optics, for example when the imaging output optics includes a wavelength tuning refractive plate.

In some implementations, the primary diffraction grating diffracts the light beam into positive and negative primary diffracted beams, and the spectrometer further includes first and second secondary diffraction channels respectively receiving the positive and negative primary diffracted beams.

Other features and advantages of the invention will be better understood upon reading of embodiments thereof with reference to the appended drawings.

DETAILED DESCRIPTION

Embodiments described below depict spectrometer designs which can, in some implementations, provide a spectral spreading of a light beam with both a high resolution and a high throughput.

Spectrometers such as described herein may for example be useful as part of a Laser-Induced Breakdown Spectroscopy (LIBS) system. As readily understood by those skilled in the art, LIBS generally relies on the use of a repetitively-fired laser source to emit intense and short pulses of light that are used to ablate/vaporize matter from a sample target. The interaction of the light pulses with the vaporized matter creates a plasma plume, which in turn radiates light. The analysis of the plasma-emitted light brings qualitative and quantitative information on the nature and concentration of the constituent elemental components of the target. More specifically, the qualitative and quantitative data related to the elemental components of the target is obtained from the processing and analysis of the spectral signature of the plasma-emitted light. In a typical LIBS configuration, the light emitted by the plasma is optically collected and brought into a spectrometer, whose function is to extract the spectral information contained in the plasma-emitted light. The output of the spectrometer consists of a spectrally spread light beam in which the contribution of each optical wavelength is physically separated. Detection of this output can provide a spectrum, that is, a two-dimensional profile representing the light intensity vs. optical wavelength.

It will however be readily understood that spectrometer designs such as described herein may be useful for optical emission spectroscopy applications other than LIBS, such as for example the analysis and characterization of DC arcs, thermal plasmas, glow discharges and spark discharges.

Figure 1:
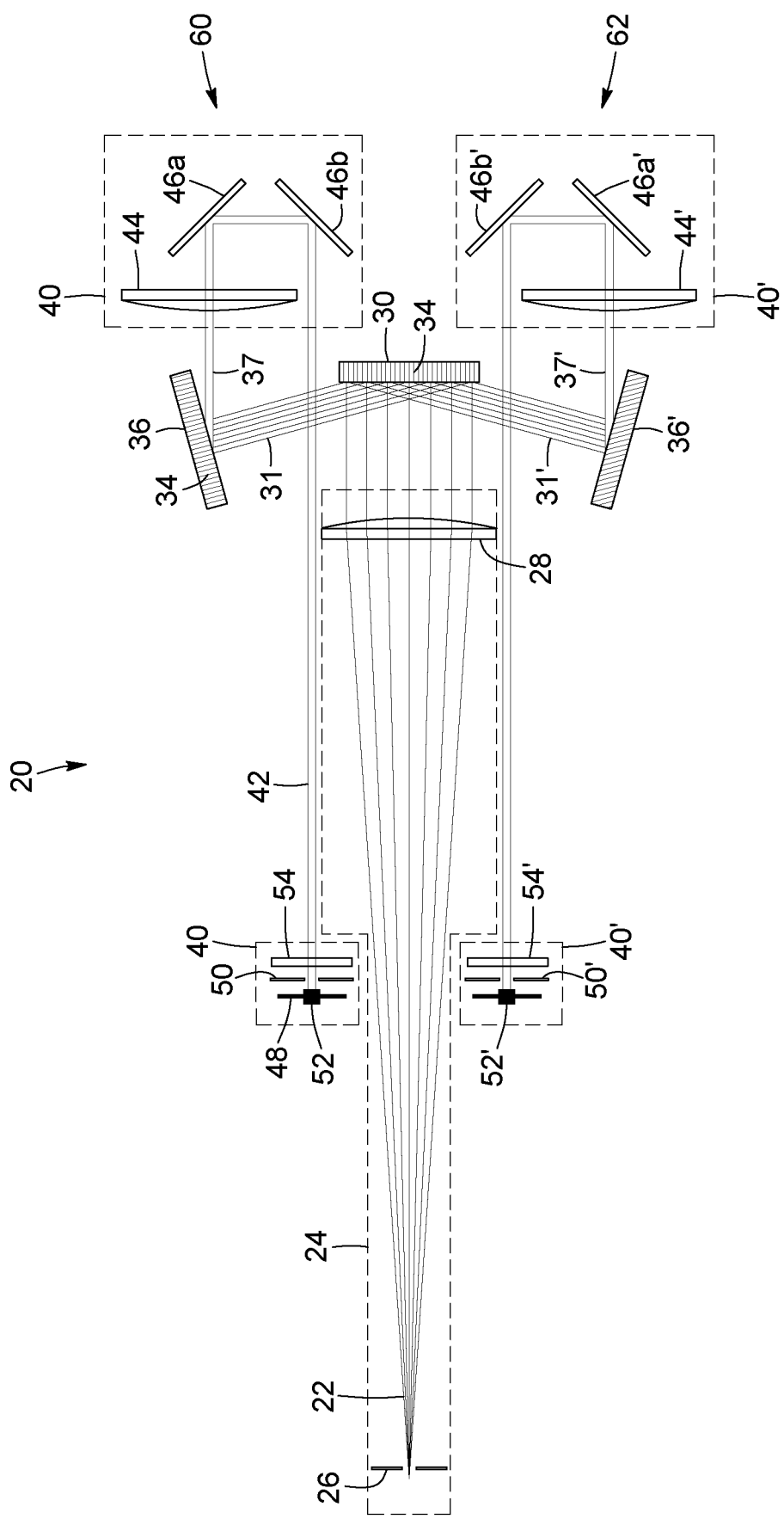
FIG. 1 is a schematic representation of a spectrometer according to one embodiment.

Referring to FIG. 1, a spectrometer 20 according to one embodiment is schematically illustrated. It will be readily understood that the components of the spectrometer 20 may be housed in a casing, frame or other structural enclosure (not shown).

The illustrated spectrometer 20 receives as input a light beam 22. The light beam 22 typically has a broadband spectral content and a spectral analysis of at least a portion of the spectral content is typically desired. As explained above, the light beam 22 may for example be plasma light from a LIBS procedure, or the like.

The spectrometer 20 may first include collimating input optics 24 receiving the light beam. In the illustrated embodiment, the input optics 24 includes an input slit 26 and a collimating lens 28. The input slit 26 creates a point-type source from the incoming light, and the light beam 22 is therefore spatially divergent upon entering the spectrometer 20. The collimating lens 28 is disposed across the path of the diverging light beam 22 and aligns its composing beam lets along a parallel direction, thereby collimating the light beam 24. The collimating lens 28 may be embodied by a cylindrical lens or by a spherical singlet lens, a multi-element spherical lens assembly (such as a combination of plano-convex and meniscus lenses, or an achromatic doublet), by a non-spherical singlet lens (such as a best-form or aspheric lens), or the like.

The spectrometer 20 further includes a primary diffraction grating 30 on which the light beam 22 collected by the collimating input optics 24 impinges. In the illustrated variant, the primary diffraction grating 30 is disposed immediately downstream the collimating lens 28, without intervening optics. In the illustrated implementation, the light beam 22 impinges on the primary diffraction grating 30 at normal incidence.

Figure 2B:
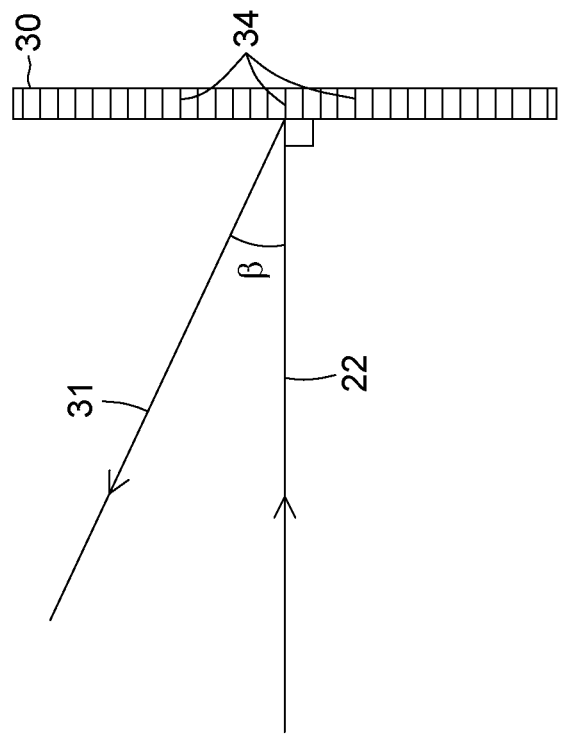
FIGS. 2A and 2B are respectively a front perspective view and a side view of a diffraction grating which can embody the first or the second diffraction grating of the spectrometer of FIG. 1.
Figure 2A:
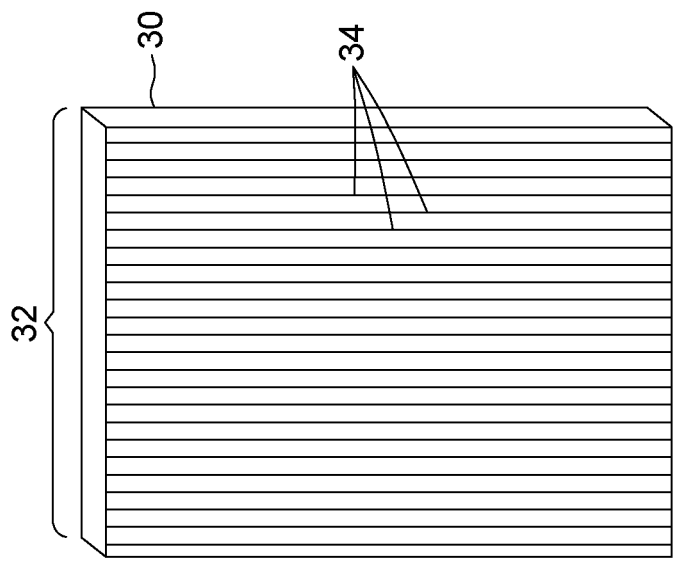

Referring to FIGS. 2A and 2B, there is shown an example of a primary diffraction grating 30 according to one embodiment. The primary diffraction grating 30 is planar and has a spatial profile 32 which defines a plurality of grooves 34 having a groove density. In some embodiments, the grooves 34 are holographic grooves produced by a process based on an interference pattern (so-called holographically formed gratings). Alternatively, the grooves 34 may be embodied by physical structures, such as produced by a ruling engine, on a surface of the primary diffraction grating 30. The grooves 34 of the primary diffraction grating have a first groove density and are configured to diffract the light beam 22 into a primary diffracted beam 31.

As known in the art, light at normal incidence on the primary diffraction grating 30 will be diffracted according to the basic grating equation:

$$\sin \beta = K \cdot \lambda$$

Where $\beta$ is the angle of diffraction, $\lambda$ is the optical wavelength (in nm) and $K=10^{-6} \cdot k \cdot n$, k being the diffraction order and n the groove density of the grating (grooves/mm). It can be shown that the available bandwidth for the primary diffracted beam 31 is limited by several factors. In practice, the primary diffracted beam 31 is typically contained within an angular range extending between the normal to the surface of primary diffraction grating and a cut-off angle $\alpha_{co}$. Shorter wavelengths are diffracted nearer the normal to the grating surface. Wavelengths greater than a cut-off wavelength $\lambda_{co}$ (corresponding to the cut-off angle) are not diffracted as they do not meet the grating equation. Preferably, the primary diffraction grating is designed such that light at wavelength of interest (such as a spectral line of a constituent of interest in a LIBS setup, for example the 267 nm line in the spectrum of gold) is diffracted within the −1 and +1 diffraction orders of the grating.

Referring back to FIG. 1, the spectrometer 20 further includes a planar secondary diffraction grating 36 positioned in a path of the primary diffracted beam 31, preferably at normal incidence. Similarly to the primary diffraction grating 30, the secondary diffraction grating 36 has a plurality of grooves 34 having a groove density. Also similarly to the primary diffraction grating 30, the grooves 34 of the secondary diffraction grating may be holographic grooves produced by a process based on an interference pattern (so-called holographically formed gratings). Alternatively, the grooves 34 may be embodied by physical structures, such as produced by a ruling engine, on a surface of the secondary diffraction grating 36. The secondary diffraction grating 36 diffracts the primary diffracted light beam 31 into a twice diffracted beam 37, according to the grating equation above.

As will be readily understood by one skilled in the art, the provision of a secondary diffraction grating 36 provides an improvement on the resolution of the spectrometer 20. Indeed, the spectral resolution, typically defined as the minimum wavelength difference $\Delta\lambda$ between two wavelengths that can be resolved unambiguously, scales with the linear dispersion of the twice diffracted beam, which depends on the groove density. However, manufacturing considerations limit the groove density which can be achieved on a single grating, therefore limiting the achievable spectral resolution. Diffracting the light beam twice therefore allows to increase the dispersion and spectral resolution beyond the physical limits of a single grating system. A same groove density on both diffraction gratings 30, 36 would for example lead to doubling the spectral resolution.

As can be readily seen in FIG. 1, the primary and secondary diffraction gratings 30 and 36 are disposed in a cascade without intervening optics therebetween. In other words, the secondary diffraction grating 36 is in direct line of sight with the surface of the primary diffraction grating 30. Advantageously, this aspect of the spectrometer design makes use of the spectral distribution of the primary diffracted beam 31 in a compact manner, enabling an increased throughput of the spectrometer 20.

The spectrometer 20 may further include imaging output optics 40. The imaging output optics 40 includes an assembly of optical components allowing the collecting and imaging of the twice diffracted beam 37.

In the illustrated embodiment, the output optics 40 includes an imaging lens 44 disposed in a path of the twice diffracted beam 37. The illustrated output optics further include a pair of beam folding mirrors 46a, 46b disposed downstream the imaging lens 44. This configuration allows the focusing of the twice diffracted beam on an image plane 48 positioned rearward of both diffraction gratings 30 and 36, providing for a compact form factor. It will be readily understood, however, that other designs may be considered. An output slit 50 may be provided near the image plane 48.

The spectrometer 20 described here provides as output a focused light beam of limited spectral bandwidth in which different wavelengths are spatially separated. The spectrometer may be combined with a suitable photodetector 52 apt to provide a spectrogram of this output light. In one example, a photodetector 52, such as an avalanche photodiode, a photomultiplier tube, a single-photon avalanche diode (SPAD), a Silicon photomultiplier detector (SiPM) or an array of such detectors may be disposed at the imaging plane 48. In some implementations, the photodetector 52 may be spectrally resolved. In the illustrated variant, the imaging output optics 40 includes a mechanism providing a fine tuning of the wavelength on the photodetector 52. Such a mechanism may for example be embodied by a wavelength tuning refractive plate 54, used in transmission, whose angular position may be accurately controlled using miniature stepping motors with encoders (not shown).

As one skilled in the art will readily understand, the illustrated design of FIG. 1 provides a compact form factor, enabling portability of a device so configured, without sacrificing the resolution and/or focal length. Traditional Czerny-Turner spectrometer designs are generally based on the use of spherical mirrors. The principal advantage of such mirrors is that they are achromatic, that is they are characterized by a focal length which is the same over a large spectral band. In the spectrometer designs described herein, achromaticity is unnecessary as the output light has a limited bandwidth centered on a wavelength of interest. The use of transmissive optics, which are not necessarily achromatic, for both collimation and imaging of the light travelling through the spectrometer 20 provides several advantages. Firstly, transmissive optical components having a wide variety of focal lengths are readily available, compared to spherical mirrors having the desired optical characteristics. Secondly, the use of a collimating lens or the like upstream the primary diffraction grating provides a greater flexibility in the optical configuration, as the lens can direct the light beam at normal incidence on the primary grating, whereas the use of mirrors imposes a folded trajectory. Furthermore, spherical mirrors typically induce aberrations (astigmatism, coma) in the reflected beam. Finally, lenses are typically less costly than mirrors.

The spectrometer configurations described herein allows the optimization of both the focal length and the spectral resolution. Depending on the target application, this feature can for example be used to either increase the resolution for a same focal length, or using a shorter focal length for an equivalent resolution as provided by prior art. It will be further understood that embodiments of the presented spectrometer can provide an improved throughput of light compared to traditional Czerny-Turner designs, as reducing the focal length increases the numerical aperture of the device, therefore allowing more light at the input of the spectrometer.

Still referring to FIG. 1, in some embodiments the spectrometer 20 may include two secondary diffraction channels 60 and 62, positioned at different positions with respect to the angularly spread spectral distribution of the primary diffracted beam 31. The two secondary diffraction channels 60 and 62 image portions of the primary diffracted beam 31 at two different angular positions. Preferably, the system is configured such that the respective secondary diffraction channels 60 and 62 intersect the positive and negative diffraction orders of the primary diffraction beam, referred to herein as the positive and negative primary diffracted beams 38, 38'. As known in the art, simultaneous diffraction of light by a grating in the +1 and −1 orders occurs if light impinges on the grating at normal incidence, and if the following condition is met:

$$-1 < \sin(\beta) < +1$$

In the illustrated embodiment, the primary diffraction grating 30 is designed and positioned to meet these criteria. Each secondary diffraction channel 60 and 62 includes its own planar secondary diffraction grating 36, 36' as described above, positioned in a path of the corresponding primary diffraction beam 38, 38'. In each secondary diffraction channel 60 and 62, the secondary diffraction grating 36, 36' is disposed in a cascade with the primary diffraction grating 30 without intervening optics therebetween.

Each secondary diffraction grating 36, 36' has a plurality of grooves having a corresponding groove density, and diffracts the corresponding primary diffracted light beam 31, 31' into a twice diffracted beam 37, 37'.

Each secondary diffraction channel 60 and 62 further includes imaging output optics 40, 40' downstream of the corresponding secondary diffraction grating 36, 36' collecting and imaging the corresponding twice diffracted beam 37, 37'. The imaging output optics 40, 40' of each secondary dispersion channel 60, 62 may for example include a corresponding imaging lens 44, 44', pair of folding mirrors 46a, 46b and 46a', 46b' and output slit 50, 50'. In this embodiment the spectrometer 20 can be combined with two photodiodes 52, 52', each disposed at an imaging plane 50, 50' of the corresponding secondary diffraction channel 60, 62, the output optics 40, 40' of each secondary diffraction channel including a corresponding wavelength tuning refractive plate 54, 54'.

The first and second secondary diffraction channels 60 and 62 may include identically configured output optics and identical secondary diffraction gratings. In other variants, both channels may have different configurations.

The provision of two secondary diffraction channels 60 and 62 can advantageously provide the parallel and simultaneous analysis of two different spectral features within a same spectral band of the light beam 22. By way of example, in the configuration of FIG. 1 the imaging output optics 40 and 40' may be arranged such that a different portion of the corresponding twice diffracted beam 37, 37', hence containing light at a slightly different wavelength, impinges on the corresponding photodetector 52. This feature may for example be advantageous in application where the intensity of a spectral line of interest is to be contrasted with the light background at a nearby wavelength.

Figure 3:
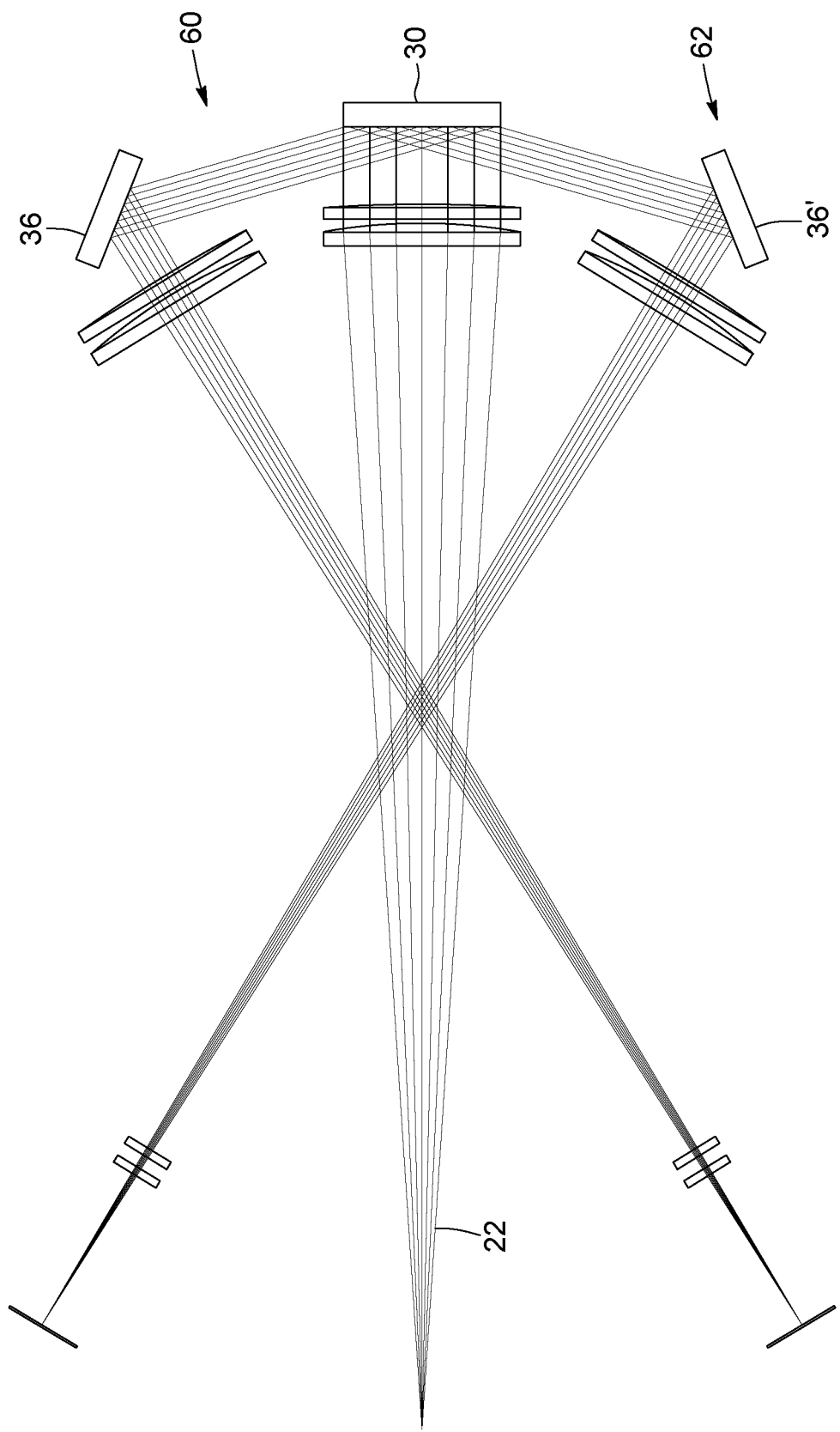
FIG. 3 is a schematic representation of a spectrometer according to another embodiment.

Referring to FIG. 3. There is shown another configuration of a spectrometer 20 according to one variant. In this variant, the folding mirrors of the design of FIG. 1 are omitted. The secondary diffraction gratings 36, 36' of the first and second diffraction channels 60 and 62 are positioned so as to reflect the corresponding twice diffracted beam 31, 31' rearwardly of the primary grating 30, in a cross-beam configuration. Such a configuration can provide a long focal length within an optimized compact form factor.

In summary, embodiments of spectrometers described herein can simultaneously meet two goals of interest for the achievement of the targeted performance for portable or hand-held probes, namely:
- obtaining the most suitable form factor for the probes (reduced physical dimensions);
- achieving a high throughput (as a result of the large numerical aperture/low f number of the design, with high spectral resolution or, equivalently, a low bandpass parameter) in order to maximize the sensitivity.

In some implementations, the spectrometer design is based on the use of transmissive optics (lenses) instead of reflective optics (mirrors) for the collimation and imaging of the input light field, which allows enhancing the design flexibility and reducing cost. The use of transmissive, non-achromatic optical components can be afforded because the spectral bandwidth of the system is very narrow by design.

Furthermore, in some implementations the spectrometer design leverages the use of a special combination of two holographic plane gratings. By directly cascading the two gratings—without intermediate optical components—in a modified Czerny-Turner spectrometer configuration, one can increase the spectral resolution with respect to the standard mono-grating approach, while keeping a low form factor. Conversely, while achieving the same spectral resolution as for the mono-grating design, this configuration allows reaching a numerical aperture value 2 or 3 times higher. The throughput being proportional to the square of the numerical aperture, this represents a very significant gain in sensitivity with respect to the standard design.

It will be noted that in the illustrated implementations, the advantages above are provided in a static design which does not feature rotation or translation degrees of freedom for the gratings, or for the collimating and imaging optics, enables a great level of thermal and mechanical stability of the configuration.

Of course, numerous modifications could be made to the embodiments described above without departing from the scope of protection as defined in the appended claims.

The invention claimed is:

1. A spectrometer and detector assembly for spectral analysis of a light beam, comprising:
   a planar primary diffraction grating positioned in a path of the light beam and diffracting the light beam into positive and negative primary diffracted beams;
   first and second secondary diffraction channels respectively receiving the positive and negative primary diffracted beams, each secondary diffraction channel comprising:
      a planar secondary diffraction grating positioned in a path of the corresponding primary diffracted beam, said secondary diffraction grating diffracting the corresponding primary diffracted beam into a twice diffracted beam of limited spectral bandwidth in which different wavelengths are spatially separated; and
   a detector;
   each secondary diffraction channel configured to direct a portion of the twice diffracted light beam to impinge on the corresponding detector; and
   wherein the secondary diffraction grating of each secondary diffraction channels is disposed in a cascade with the primary diffraction grating without intervening optics therebetween.

2. The spectrometer and detector assembly according to claim 1, further comprising collimating input optics upstream the primary diffraction grating.

3. The spectrometer and detector assembly according to claim 2, wherein the collimating input optics comprises one or more transmissive optical components collimating the light beam.

4. The spectrometer and detector assembly according to claim 2, wherein the collimating input optics comprises a collimating lens disposed in front of the primary diffraction grating.

5. The spectrometer and detector assembly according to claim 1, wherein each secondary diffraction channel further comprises imaging output optics between the corresponding secondary diffraction grating and detector.

6. The spectrometer and detector assembly according to claim 5, wherein the imaging output optics of each secondary diffraction channel comprises transmissive optical components imaging the corresponding twice diffracted beam.

7. The spectrometer and detector assembly according to claim 5, wherein the imaging output optics of each secondary diffraction channel comprise an imaging lens disposed in a path of the corresponding twice diffracted beam.

8. The spectrometer and detector assembly according to claim 7, wherein the imaging output optics of each secondary diffraction channel further comprise a pair of beam folding mirrors disposed downstream the corresponding imaging lens.

9. The spectrometer and detector assembly according to claim 5, wherein the imaging output optics of each secondary diffraction channel comprise a wavelength tuning refractive plate.

10. The spectrometer and detector assembly according to claim 1, wherein the primary diffraction grating and secondary diffraction gratings each comprise a plurality of holographic grooves.

11. The spectrometer and detector assembly according to claim 1, wherein the primary diffraction grating and secondary diffraction gratings each comprise a plurality of structural grooves formed on a surface of the corresponding one of said primary and secondary diffraction grating.

12. The spectrometer and detector assembly according to claim 1, wherein the detector of each of the first and second secondary diffraction channels is a photodetector.

13. The spectrometer and detector assembly according to claim 12, wherein each photodetector is one of an avalanche photodiode, a photomultiplier tube, a single-photon avalanche diode, or a Silicon photomultiplier detector.

14. The spectrometer and detector assembly according to claim 12, wherein each secondary diffraction channel comprises a tuning mechanism providing a fine tuning of the wavelength of the portion of the twice diffracted light beam impinging on the corresponding photodetector.

15. The spectrometer and detector assembly according to claim 12, wherein the first and second secondary diffraction channels are configured to impinge different portions of the twice diffracted light beam, respectively containing light at different wavelengths, on the corresponding photodetector.

16. The spectrometer and detector assembly according to claim 15, wherein the different wavelengths of light impinged on the photodetectors of the first and second secondary diffraction channels respectively correspond to a spectral line of interest and a background light.

17. A spectrometer and detector assembly for the parallel and simultaneous analysis of two different spectral features within a same spectral band of a light beam, comprising:

a planar primary diffraction grating positioned in a path of the light beam and diffracting the light beam into positive and negative primary diffracted beams;

first and second secondary diffraction channels respectively receiving the positive and negative primary diffracted beams, each secondary diffraction channel comprising:

a planar secondary diffraction grating positioned in a path of the corresponding primary diffracted beam, said secondary diffraction grating diffracting the corresponding primary diffracted beam into a twice diffracted beam having a limited spectral bandwidth covering said spectral band in which different wavelengths are spatially separated; and a photodetector;

each secondary diffraction channel configured to direct different portions of the twice diffracted light beam, respectively containing light at different wavelengths, to impinge on the corresponding photodetector; and wherein the secondary diffraction grating of each secondary diffraction channels is disposed in a cascade with the primary diffraction grating without intervening optics therebetween.

18. The spectrometer and detector assembly according to claim 17, wherein the different wavelengths of light impinged on the photodetectors of the first and second secondary diffraction channels respectively correspond to a spectral line of interest and a background light.

19. The spectrometer and detector assembly according to claim 18, wherein the spectral line of interest is a spectral line of a constituent of interest in a LIBS setup.

20. The spectrometer and detector assembly according to claim 17, wherein each secondary diffraction channel comprises a tuning mechanism providing a fine tuning of the wavelength of the portion of the twice diffracted light beam impinging on the corresponding photodetector.

21. The spectrometer and detector assembly according to claim 20, wherein the tuning mechanism of each secondary diffraction channel comprise a wavelength tuning refractive plate.

* * * * *